(12) United States Patent
Turhal

(10) Patent No.: US 9,971,990 B1
(45) Date of Patent: May 15, 2018

(54) TAG DEVICE FOR GLASSES

(71) Applicant: Ece Turhal, Livermore, CA (US)

(72) Inventor: Ece Turhal, Livermore, CA (US)

(73) Assignee: Ece Turhal, Livermore, CA (US)

( * ) Notice: Subject to any disclaimer, the term of this patent is extended or adjusted under 35 U.S.C. 154(b) by 0 days. days.

(21) Appl. No.: 15/620,842

(22) Filed: Jun. 13, 2017

(51) Int. Cl.
*G06K 19/06* (2006.01)
*G06Q 10/08* (2012.01)
*G06K 19/077* (2006.01)

(52) U.S. Cl.
CPC ..... *G06Q 10/087* (2013.01); *G06K 19/06037* (2013.01); *G06K 19/0776* (2013.01)

(58) Field of Classification Search
CPC .. G06Q 10/087; G06K 19/00; G06K 19/0776; G06K 19/06
USPC .................................. 235/492, 385; 340/5.1
See application file for complete search history.

(56) References Cited

U.S. PATENT DOCUMENTS

| | | | | |
|---|---|---|---|---|
| 2010/0171586 A1* | 7/2010 | Park | ................. | G06K 19/0717 340/5.1 |
| 2014/0361074 A1* | 12/2014 | Kumar | ............. | G06F 17/30011 235/376 |
| 2016/0210547 A1* | 7/2016 | Dekeyser | ............... | G06K 7/065 |
| 2016/0296810 A1* | 10/2016 | Mandel | .................. | A63B 60/00 |
| 2017/0193260 A1* | 7/2017 | Prusik | ................. | G06K 7/1473 |

* cited by examiner

*Primary Examiner* — Daniel Hess
(74) *Attorney, Agent, or Firm* — Gokalp Bayramoglu

(57) ABSTRACT

The invention provides a tag device for a pair of glasses, including: a glue layer, a RFID tag provided on the glue layer; a color changing object provided on the RFID tag; a QR code layer attached on the color changing object, wherein the glue layer is attached on a lens of the pair of glasses, and a QR code on the QR code layer stores information including a size of the pair of glasses, optional colors of the pair of glasses, a stock quantity of the pair of glasses, and a link to a website.

7 Claims, 4 Drawing Sheets

TAG DEVICE FOR GLASSES

TECHNICAL FIELD

The present invention relates to a tag device for security and inventory management, particularly relating to a tag device attached on glasses.

BACKGROUND OF THE INVENTION

Generally, each pair of glasses has a tag, which is used by optometrists and opticians. The tag carries a bar code including information related to a patient's medical health record, an inventory, and an order. As shown in FIG. 1, the current tagging system in an optical store involves a sticky tag 11 attached to the frame of the glasses. If the sticky sides of the tag 11 do not align, they collect dust, catch patient's hairs, and thus have an unsanitary and bad look. The tag 11 is then removed once the frame is purchased. However, a sticky residue is often left and needs to be thoroughly cleaned with alcohol. It is also possible that the residue or the cleaning solution could damage the frame. Dispensing a frame with adhesive on it brings the quality of the frame and the service down.

Further, as shown in FIG. 2, a security device 21 may also be provided on the frame to prevent from theft. The security device 21 is bulky on the frame and obtrusive when the patient tries on the glasses. The bulky security device also creates an air of distrust in the doctor-patient relationship.

Additionally, if the frame is a poor seller, it takes up inventory space and takes away from sales. If this frame finally does sell, the current inventory system may automatically reorder the frame, and thus cause a huge waste.

SUMMARY OF THE INVENTION

In view of the disadvantages in the prior art, the invention provides a tag device for a pair of glasses, including: a glue layer, a RFID tag provided on the glue layer; a QR code layer attached on the RFID tag.

As another implementation, the tag device further includes a color changing object, wherein the color changing object is provided between the RFID tag and the QR code layer.

As another implementation, the glue layer is attached on a lens of the pair of glasses.

As another implementation, the glue layer is attached on a frame of the pair of glasses.

As another implementation, a QR code on the QR code layer stores information including a size of the glasses, optional colors of the glasses, and a stock quantity of the glasses.

As another implementation, a QR code on the QR code layer stores information including a link to a website.

As another implementation, the color changing object is a color changing gel, including gold nanorods and silver chloride.

As another implementation, the color changing object includes at least one color changing LED.

As another implementation, the invention provides a tag device for a pair of glasses, including: a glue layer, a RFID tag provided on the glue layer; a color changing object provided on the RFID tag; and a QR code layer attached on the color changing object; wherein the glue layer is attached on a lens of the pair of glasses, and a QR code on the QR code layer stores information including a size of the pair of glasses, optional colors of the pair of glasses, a stock quantity of the pair of glasses, and a link to a website.

As another implementation, the invention provides a pair of glasses, comprising: a lens, a tag device attached on the lens, the tag device including, a glue layer, a RFID tag provided on the glue layer; a color changing object provided on the RFID tag; and a QR code layer attached on the color changing object; wherein the glue layer is attached on the lens, and a QR code on the QR code layer stores information including a size of the pair of glasses, optional colors of the pair of glasses, a stock quantity of the pair of glasses, and a link to a website.

DETAILED DESCRIPTION OF THE INVENTION

In order to make the purpose, characteristics and advantages of the present invention more clearly understandable, the embodiments of the invention will be further described in detail with reference to the accompanying drawings. However, the present invention can be implemented in many other ways different from the description herein. The ordinary person skilled in the art can make similar improvements to the present invention without departing from the scope of the present invention.

Figure 1:
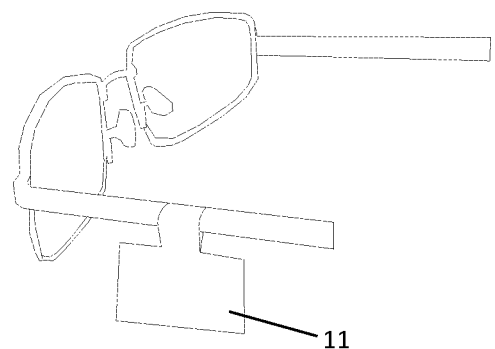
FIG. 1 shows a pair of glasses with a traditional tag attached on a frame.
Figure 2:
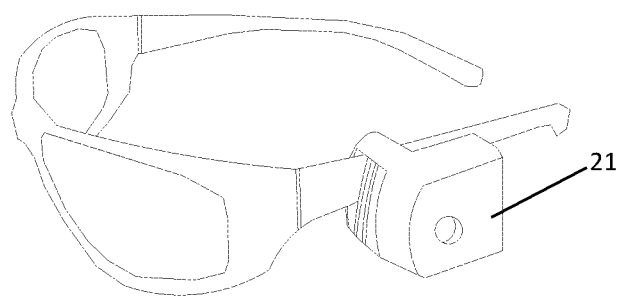
FIG. 2 shows a pair of glasses with a traditional security device attached on a frame.
Figure 3:
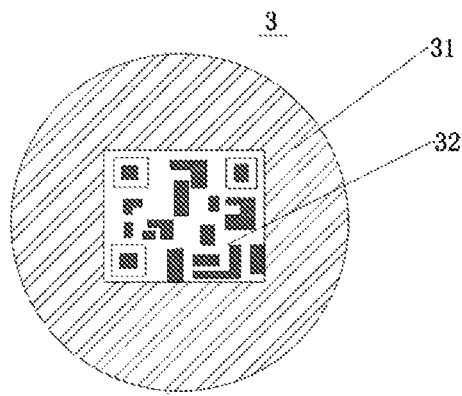
FIG. 3 shows a front view of a tag device of an embodiment of the invention.
Figure 4:
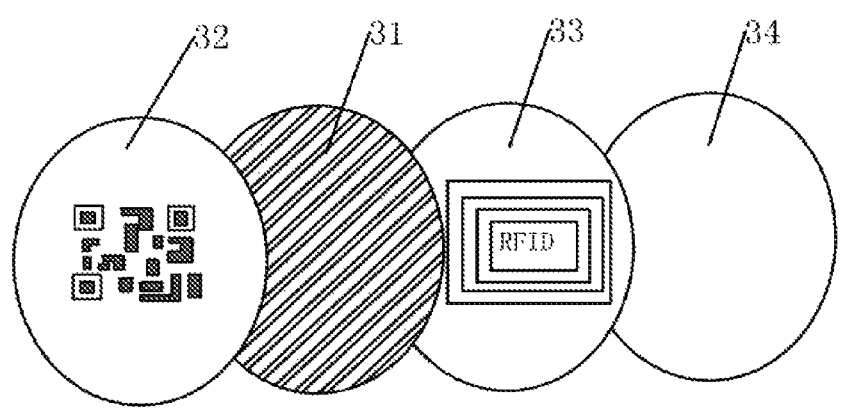
FIG. 4 shows an explosive view of a tag device of an embodiment of the invention.

Referring to FIG. 3 and FIG. 4, the invention provides tag device 3, including: glue layer 34, RFID tag 33 provided on glue layer 34, color changing object 31 provided on RFID tag 33 and QR code layer 32 attached on color changing object 31.

Figure 6:
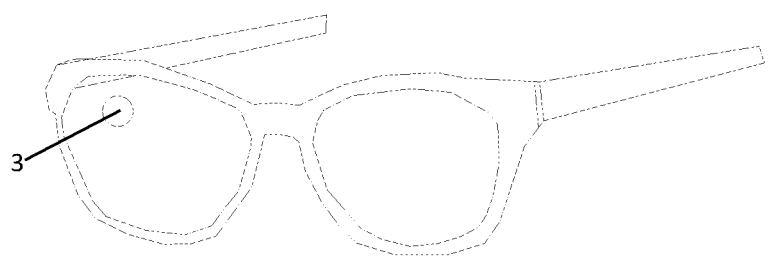
FIG. 6 shows a pair of glasses with a tag device of the invention attached on a lens.
Figure 7:
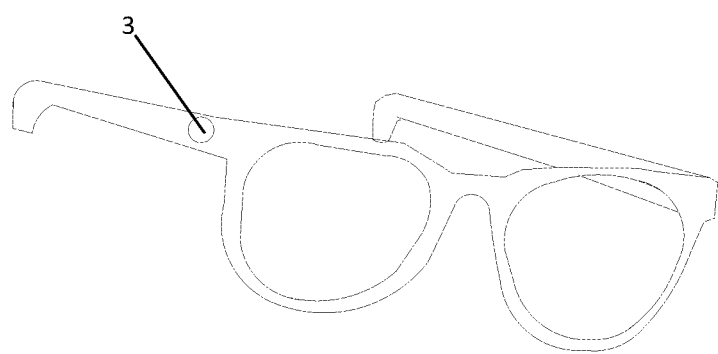
FIG. 7 shows a pair of glasses with a tag device of the invention attached on a frame.

Referring to FIG. 6, tag device 3 is attached on a lens of the pair of glasses. Specifically, glue layer 34, i.e., the bottom layer of tag device 3, is attached on a lens of the pair of glasses. Residue of glue layer 34 is not an issue on this lens, because the patient doesn't receive the lens when they purchase the frame. Furthermore, the lens is much easier to clean than the frame. Alternatively, referring to FIG. 7, tag device 3 may also be attached on a frame of the pair of glasses. Specifically, glue layer 34 is attached on a frame of the pair of glasses.

The QR code on QR code layer 32 stores information including a size of the glasses, optional colors of the glasses, and a stock quantity of the glasses, etc. Additionally, the information may also include a link to a website. Specifically, the website may be a social media website reciting the celebrities who wear the glasses of the same type. In another embodiment, the website may be an on-line shopping website. In another embodiment, the website may show features chosen by the manufacturer to extend their advertising and branding efforts. The QR code may also be integrated in the patient's health record and an inventory record for the optician. The patient or the optician may scan the QR code by a scanning application on a tablet or a smart phone and access the related information stored in the QR code.

RFID tag 33 is included in tag device 3 for security protection. Specifically, RFID tag 33 would alert the staff if the pair of glasses is taken out of the optical store. Compared to the security device in the prior art, RFID tag 33 of the invention is small and inconspicuous. Accordingly, a RFID detector for detecting RFID tag 33 and alerting the staff is installed in the optical store, for example, on the gate of the optical store.

Color changing object 31, for example, a color changing gel is included in tag device 3. In one embodiment, the color changing gel gradually changes the color from red to green within six months. The inventory success is indicated with regard to the color of tag device 3. It is useful for the optician to assess the sales status of this pair of glasses. The timeframe within which the color changing gel changes is optional. The color changing gel includes gold nanorods and silver chloride. Initially, the color changing gel is red due to the nanorods. A chemical reaction between the two compounds changes the color to green over time. Additional chemicals may be added to the gel to adjust the rate of the chemical reaction, so that the timeframe is adjusted accordingly.

Figure 5:
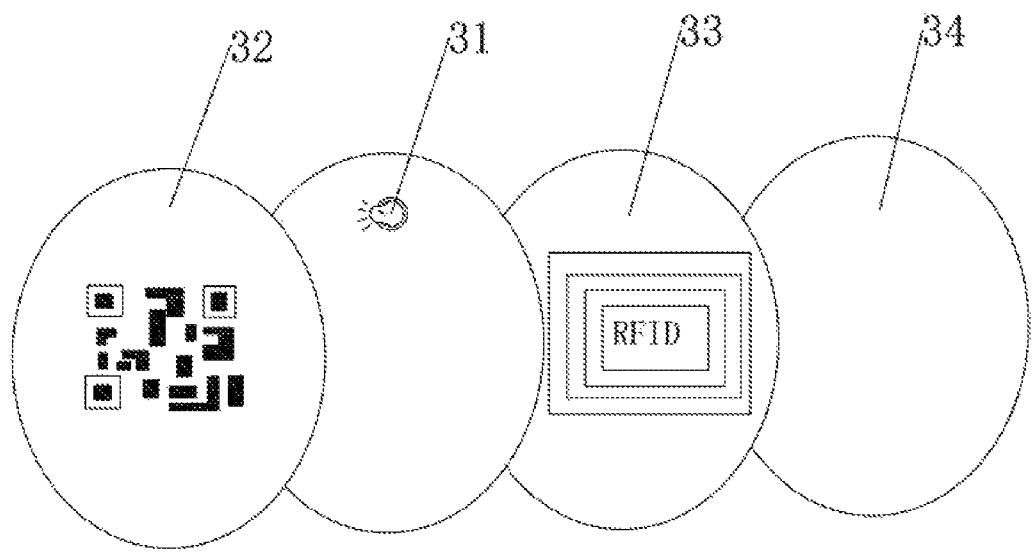
FIG. 5 shows an explosive view of a tag device of another embodiment of the invention.

As another embodiment, referring to FIG. 5, Color changing object 31 may be a color changing LED or several color changing LEDs. Each color changing LED gradually changes the color from red to green within six months. The timeframe within which each color changing LED changes is optional.

The embodiments described above are merely illustrative of several embodiments of the invention, and the descriptions thereof are specific and detailed. However, these descriptions are not to be construed as a limitation to the scope of the invention. It should be noted that various modifications and improvements can be made by the ordinary person skilled in the art without departing from the conception of the present invention, and fall within the scope of the present invention. Therefore, the protection scope of the present invention should be determined by the appended claims.

I claim:

1. A tag device for a pair of glasses, comprising:
    a glue layer,
    a RFID tag provided on the glue layer;
    a QR code layer attached on the RFID tag; and
    a color changing object, wherein the color changing object is provided between the RFID tag and the QR code layer;
    wherein the color changing object is a color changing gel, including gold nanorods and silver chloride.

2. The tag device of claim 1, wherein the glue layer is attached on a lens of the pair of glasses.

3. The tag device of claim 1, wherein the glue layer is attached on a frame of the pair of glasses.

4. The tag device of claim 1, wherein a QR code on the QR code layer stores information including a size of the glasses, optional colors of the glasses, a stock quantity of the glasses.

5. The tag device of claim 1, wherein a QR code on the QR code layer stores information including a link to a website.

6. A tag device for a pair of glasses, comprising:
    a glue layer,
    a RFID tag provided on the glue layer;
    a color changing object provided on the RFID tag; and
    a QR code layer attached on the color changing object,
    wherein the glue layer is attached on a lens of the pair of glasses, and a QR code on the QR code layer stores information including a size of the pair of glasses, optional colors of the pair of glasses, a stock quantity of the pair of glasses, and a link to a website, wherein the color changing object is a color changing gel, including gold nanorods and silver chloride.

7. A pair of glasses, comprising:
    a lens,
    a tag device attached on the lens, the tag device including,
        a glue layer,
        a RFID tag provided on the glue layer;
        a color changing object provided on the RFID tag; and
        a QR code layer attached on the color changing object,
        wherein the glue layer is attached on the lens, and a QR code on the QR code layer stores information including a size of the pair of glasses, optional colors of the pair of glasses, a stock quantity of the pair of glasses, and a link to a website,
    wherein the color changing object is a color changing gel, including gold nanorods and silver chloride.

* * * * *